United States Patent [19]
Gillberry

[11] Patent Number: 5,870,140
[45] Date of Patent: Feb. 9, 1999

[54] SYSTEM FOR REMOTE METER VIEWING AND REPORTING

[75] Inventor: Wilfred A. Gillberry, Oshawa, Canada

[73] Assignee: Harbour Management Services Limited, Oshawa, Canada

[21] Appl. No.: 719,663

[22] Filed: Sep. 25, 1996

[51] Int. Cl.⁶ ...................................................... H04N 7/18
[52] U.S. Cl. ...................... 348/160; 340/870.02; 382/100
[58] Field of Search .................................. 348/143, 160; 340/870.02; 382/100; H04N 7/18

[56] References Cited

U.S. PATENT DOCUMENTS

| | | | |
|---|---|---|---|
| 4,104,486 | 8/1978 | Martin et al. | 379/106.06 |
| 4,126,762 | 11/1978 | Martin et al. | 379/106.06 |
| 4,133,034 | 1/1979 | Etter | 705/412 |
| 4,151,371 | 4/1979 | Yoshihara | 379/106.04 |
| 4,241,237 | 12/1980 | Paraskevakos | 340/825.26 |
| 4,394,540 | 7/1983 | Willis et al. | 379/106.06 |
| 4,680,704 | 7/1987 | Konicek | 348/160 |
| 4,764,953 | 8/1988 | Chern et al. | 379/355 |
| 4,817,131 | 3/1989 | Thornborough | 379/106.04 |
| 4,833,618 | 5/1989 | Verma et al. | 364/483 |
| 4,866,761 | 9/1989 | Thornborough | 379/106.06 |
| 4,902,965 | 2/1990 | Bodrug et al. | 324/116 |
| 5,031,209 | 7/1991 | Thornborough | 379/106.03 |
| 5,239,575 | 8/1993 | White et al. | 379/106.06 |
| 5,311,581 | 5/1994 | Merriam et al. | 379/106.07 |
| 5,559,894 | 9/1996 | Lubliner | 382/100 |
| 5,673,331 | 9/1997 | Lewis | 382/100 |

FOREIGN PATENT DOCUMENTS

| | | |
|---|---|---|
| 1155243 | 10/1983 | Canada . |
| 0 244 384 A | 11/1987 | European Pat. Off. . |
| 0 251 549 A | 1/1988 | European Pat. Off. . |
| 0 279 759 A | 8/1988 | European Pat. Off. . |
| WO89 08959 | 9/1989 | WIPO . |

Primary Examiner—Howard Britton
Attorney, Agent, or Firm—Ridout & Maybee

[57] ABSTRACT

A system for remote meter viewing and reporting. The system comprises a remote camera located at the meter. The remote camera is coupled to a central computer through a communications channel. In response to a command from the central computer, the camera scans the meter face, i.e. readings on the dials, and stores an image in memory. The scanned image is transmitted to the central computer. The central computer includes software for analyzing the scanned image in determining the consumption of electricity, for example, by comparing the current readings on the dials with the readings on the dials taken at the last billing cycle. The processed image is then used to generate a billing statement which is sent to the household consumer using conventional post. In another aspect, the billing statement generated by the system includes scanned images of the past and current meter readings. The system according to the present invention is suitable for public utilities, such as gas, electricity, water companies and leasing companies who lease office equipment to companies situated in remote locations, which equipment is fitted with meters which record their use, i.e. copying machines, printers, etc. where it is desirable to determine the quantities of copies made, thus enabling the timely scheduling of visits of company service representatives to perform ongoing maintenance, thereby helping to ensure minimal down-time and optimal equipment performance.

15 Claims, 4 Drawing Sheets

Mr. W.A. Gillberry　　　　　　　　　　　　ACCOUNT No. 1234567　　／36

| MTR. | PRES | - PREV | * MULT | = KWHS | DAYS | KWHC/DAY | CHARGE |
|---|---|---|---|---|---|---|---|
| 1 | 97364 | 78266 | | 19098 | 60 | 3183 | ? |

PREVIOUS　　　　　　　　　　　　　　　　　PRESENT

SYSTEM FOR REMOTE METER VIEWING AND REPORTING

FIELD OF THE INVENTION

The present invention relates to a system for reading a remote meter, such as a utility meter located at a residential house, and more particularly to a system for capturing an image of the face of the utility meter and transmitting the scanned image to the utility for automated billing statement generation.

BACKGROUND OF THE INVENTION

Modern households are powered by electricity, gas and water. The household receives electricity from the electrical company, in many cases a public utility. Similarly, natural gas is supplied by a gas provider, and water is supplied by the water commission.

The consumption of electricity, gas and water is measured by meters which have been installed at the customer's house. The electricity meter measures the amount of electricity, i.e. power, used by the household and the consumption of electrical power is indicated by readings on the meter. The electrical meter typically comprises a number of dial meters which show the power consumption in kilowatt hours (kWh). In order to bill the consumer, it is necessary for the electrical utility to obtain a power consumption reading from the meter. Since the meter is located at the household, an employee from the power utility must physically visit the house to take the readings from the meter. Therefore, before the electrical utility can issue bills to its customers, the electrical meters at each house must be manually read. It will be appreciated that this represents a significant expenditure of manual effort. The situation is further exacerbated by the inaccessibility of some meters, e.g. located inside the basement of the house, and the unavailability for reading during normal working hours when the occupants of the house are at work. Return visits only increase the cost and length of time from the meter reading to issuance of a statement. Moreover, the profitability of an electrical utility is becoming increasingly dependent on the cost-effective provision of services and this means billing its customers at regular intervals.

In an attempt to overcome the problem of inaccessible meters, some power utilities have offered a "one-time" subsidy to householders to encourage them to relocate their electricity meters from inside the premises to outside, where they can be read by the utilities employees at their convenience. However, in most cases, the subsidy is far less than the actual cost for relocating the meter and results in an out-of-pocket expenditure for the consumer. Consequently, such an approach has not met with overwhelming success, and the problem of reading inaccessible meters remains.

In another attempt to provide billings at regular and frequent intervals, electrical power utilities have resorted to other techniques. One method involves estimating power consumption for a household based on past usage patterns. The consumer is billed based on an estimate, an every few months, for example six months, the meter is manually inspected and the actual power consumption is determined. Although such an approach is effective to reduce the number of on-site visits required by utility employees, it may be less than satisfactory from the viewpoint of the power utility or the consumer. For example, if the estimated power consumption is less than the actual power consumption, then the power utility is not collecting all the revenue it is owed. Similarly, if the estimate is overly conservative, then the consumer is paying for electricity which is not being used, which is not desirable from the consumer point of view and leads to the impression of over-billing.

Another method used by some electrical utilities in an attempt to reduce the number of on-site meter inspections involves sending out printed cards which resemble the meter face. The consumer is then obliged to fill in the cards according to meter position on each of the dials. Once again, while such an approach is effective in reducing the need to send out utility staff to read the meters, it does have shortcomings. Firstly, reliance on a consumer to accurately transpose the meter readings to the printed card introduces an element of error. Secondly, the unscrupulous consumer who understands the meter readings can transcribe inaccurate fraudulent meter readings. Although such fraud would eventually be uncovered by a routine meter check, it does lead to short term losses for the electrical utility and the need to send out a utility employee. The printed card method also introduces a further delay in obtaining meter readings which must be processed before billing statements can be generated and sent out to the consumers.

In an attempt to overcome these shortcomings, various automated systems (referred to as "smart meters") have been developed. Known smart meters are sold under various names such as for example, Power Stat™, Nertec™, Hexagram™ and Data Star™. Such systems vary in price from approximately $220 for the Hexagram™ meter to $3000 for the Data Star™ meter. Such meters can provide an adequate solution (albeit an expensive one) to the problem of on-site meter reading, however they are usually subject to strict government regulations. In the eyes of regulatory bodies, such smart meters are perceived as having an inherent deficiency—the potential to report a false or incorrect reading relative to the actual reading on the meter. In Canada, for example, the Federal government has mandated that meter reading produced by such smart meters (i.e. non-intrusive reporting technology) be visually audited at least once a year, as a check to confirm that the "smart meters" are reporting power consumption accurately. It will be appreciated that such additional audit readings represent a significant additional expense for the utilities, without providing any reciprocal benefit.

A further disadvantage experienced with the smart meters from the standpoint of a public electrical utility is that the existing meters in the premises have already been amortized by the property owner, and replacement units for conventional analog meters are typically less than $100, therefore upgrading residential sites with smart meter represents a significant capital expenditure, and the end consumer would be reluctant to pay for the expenditure, thereby putting the financial burden on the electrical utility. Moreover, the staff at the utilities are fully trained to maintain, test and certify the existing meters. If a new smart meter is introduced, the utilities are faced with the prospect of trying to pass on the cost for personnel training, and the sophisticated calibrating and testing equipment which would be required, in addition to the high initial capital cost.

It will be appreciated that the profitability of a power utility depends in large part on billing customers on a timely fashion and collecting payments on a regular basis. Given that the business community usually extends credit for thirty days, if there was an economically viable method available for invoicing consumer at 15- or 30-day, rather than 60-day intervals, significant revenues could be captured earlier in the billing cycle by the power utilities.

Electricity generation is no longer a "natural monopoly", as more fuel efficient technologies are being introduced.

Economic competition has forced industry to realize just how important electricity prices are in creating or destroying competitive advantage. The proposed restructuring of the North America (U.S.) Electric Utility industry will likely involve deregulation, which in turn, will enable consumers to buy power from any broker or supplier, not just their local monopoly utility.

Restructuring will mean new markets for electric companies, distributors, equipment manufacturers including the cable and telecommunications industries, new freedom for businesses to buy in an open market, and new opportunities for other industries. To capitalize on these opportunities, electric power companies are planning to dramatically boost customer service and market imaginative new products such as real-time pricing.

The ability of consumers to choose their energy suppliers and take advantage of an open market, real-time pricing, etc., will be enhanced if their electric meters can be accessible for reading at any time, thus permitting the accurate recording in real time of power consumed up to the (predetermined) moment of cessation of power provided by one supplier, prior to commencing to consume power provided by a new supplier. While meters continue to be read visually on a premises-by-premises basis, the option of reading the meter at any time is unavailable at an acceptable cost.

Thus, there remains a need for a meter which can be scanned or read at any time and from a remote location, by the public utility or a billing agent of the utility. Such a meter preferably is available for reading without the need for on-site inspection and verification, and is accessible from a remote location at any time or on demand.

BRIEF SUMMARY OF THE INVENTION

Accordingly, the present invention provides a system for scanning a remote meter and recording an image of the meter face. The image is then processed to determine consumption and generate a billing statement which is sent to the consumer.

Accordingly the present invention advantageously provides a method for obtaining a "hard" reading of a gas, water or electrical meter where the meter may be located inside or outside the consumer's premise. The accuracy of the meter is not corrupted by a malfunctioning reporting mechanism. Since the meter reading is transmitted as a captured image of a meter dial, the system only reports the defacto energy consumption that is registered by the meter at the time the image is scanned. As the system can only transmit a scanned image, if the system is not functioning, it will either fail to transmit a scanned image, or transmit an image whose quality makes it unrecognizable, and the central processing computer will reject such images, and trigger an investigation into the cause of the malfunction. Consequently, the system will transmit a picture of what the meter dials register, or no image at all.

By virtue of the fact that the system is incapable of reporting a reading which is at variance with the consumption indicated on the meter, (i.e. the system transmits an image of the indicated consumption as registered on the dials of the meter), the requirement for a representative of a power utility to make a special verification reading, for example at least once a year, at each premise with a meter that has been retro-fitted is redundant.

In one aspect, the system according to the present invention provides a facility for producing a permanent record of the actual consumption in the form of a video picture print of the meter face for each consumer or customer of the utility. The video picture print shows the amount of energy registered by the meter at a specific date and time.

In another aspect, the video picture or captured image of the meter is printed for each householder's billing statement. Preferably, the billing statement includes a reproduction of video picture frame or image of the dials on the meter registering present consumption, and a reproduction of the video picture frame of the dials registering the previous consumption reading, e.g. reported 30 or 60-days earlier. This feature enables households to compare the amount of electrical energy consumed during the interval between the remote meter readings. Furthermore, since the meter dial can be visually inspected, householders have the ability to inspect their meters to confirm to their own satisfaction that the consumption reported on their bill is correct. This capability provides the public utility with a strong public relations tool since it can comfort consumers who may have the perception that they are being over-billed.

In a further aspect, the present invention provides a system for remote meter viewing and reporting. According to this aspect of the invention, a central computer located at the power utility dials up the telephone line of each consumer. The telephone line is connected to a camera which is positioned to scan the face of the meter. The central computer issues a command to turn on the camera and begin transmitting a video signal (i.e. video frames) or still images. The transmitted video signal is received by the central computer and stored in memory. The video signal can be permanently recorded on a suitable medium such as a video laser disk or simply saved as a digitized image in computer memory. Upon complete reception of the digitized image, the central computer deactivates the video camera and repeats the process for the next customer of the utility. Once the scanned image has been stored in memory, the central computer executes image processing routines which determine the meter reading given by the captured image of the meter face readings. The current meter reading is compared to the previous or last meter reading to determine the amount of electricity which was used by the household. The electrical consumption determination is then used to generate a billing statement for each customer or client. The billing statements are sent by mail to the client obliging them to pay an amount due for the actual consumption over the billing interval.

The present invention provides a system for viewing and reporting readings from a meter located in a remote location, said system comprising: (a) image capture means for capturing an image of a reading on the meter, said image capture means being located at said meter; (b) said image capture means including transmitter means for transmitting said image to another location; (c) central processing means for processing said image captured by said image capture means at the location of said meter; and (d) said central processing means being located at a distance from the meter and including communication means for receiving said transmitted image from said image capture means.

The present invention also provides in another aspect a method for viewing and reporting readings from a meter located in a remote location, the remote location including an image capture device focused on the meter and a communications device accessible by a central processing unit through a communications link, said method comprising the steps of: (a) establishing a connection between said remote communications device and said central processing unit; (b) enabling said image capture device to capture an image of readings on said meter; (c) transmitting said captured image to said central processing unit via said communications link;

(d) processing the meter readings captured in said image at said central processing unit to generate a consumption figure; (e) generating a billing statement for said consumption figure.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
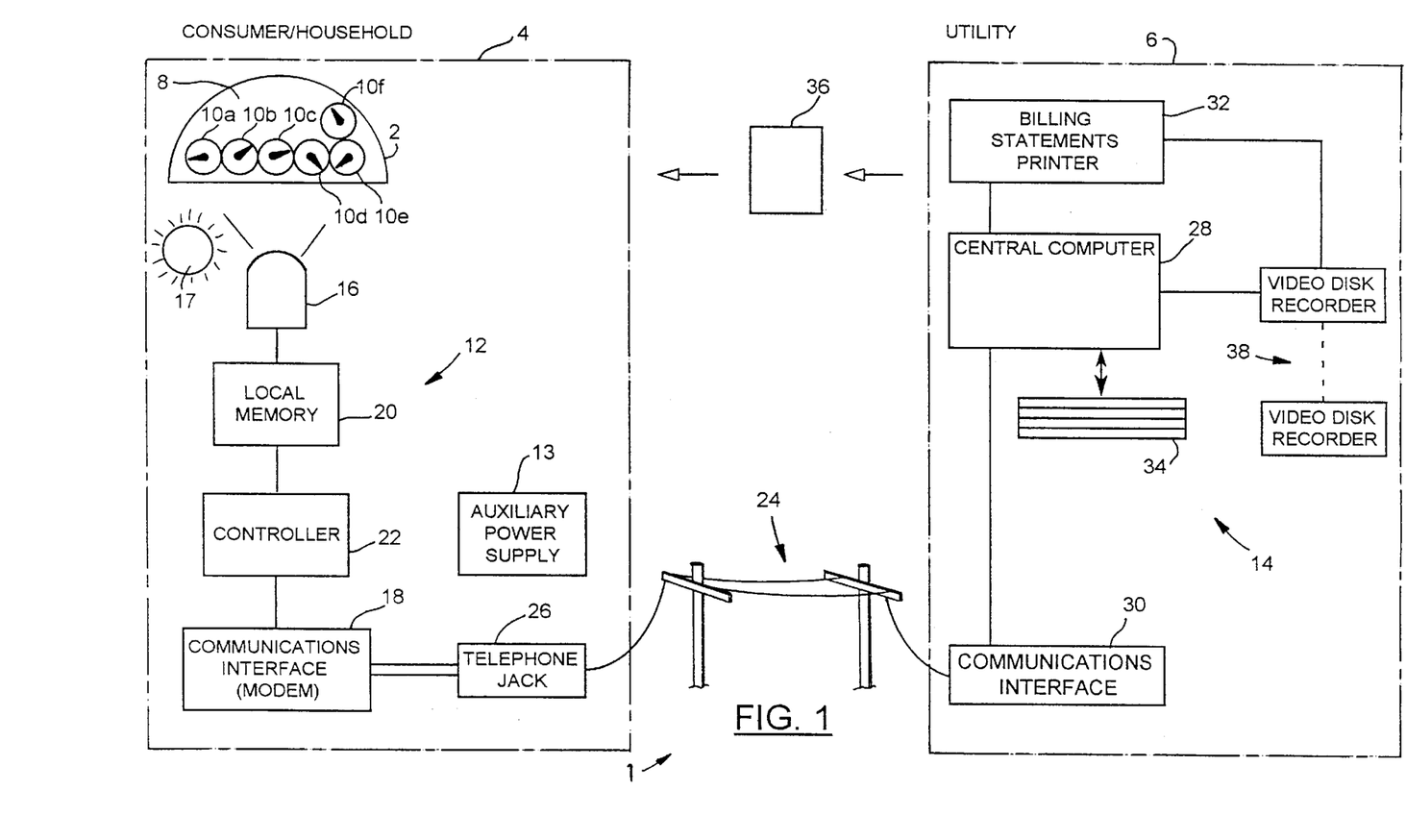
FIG. 1 shows in schematic form a system for remote meter viewing and reporting according to the present system.

Reference is first made to FIG. 1 which shows in schematic form a system for remote meter viewing and reporting according to the present invention. The system is indicated generally by reference 1.

Figure 3:
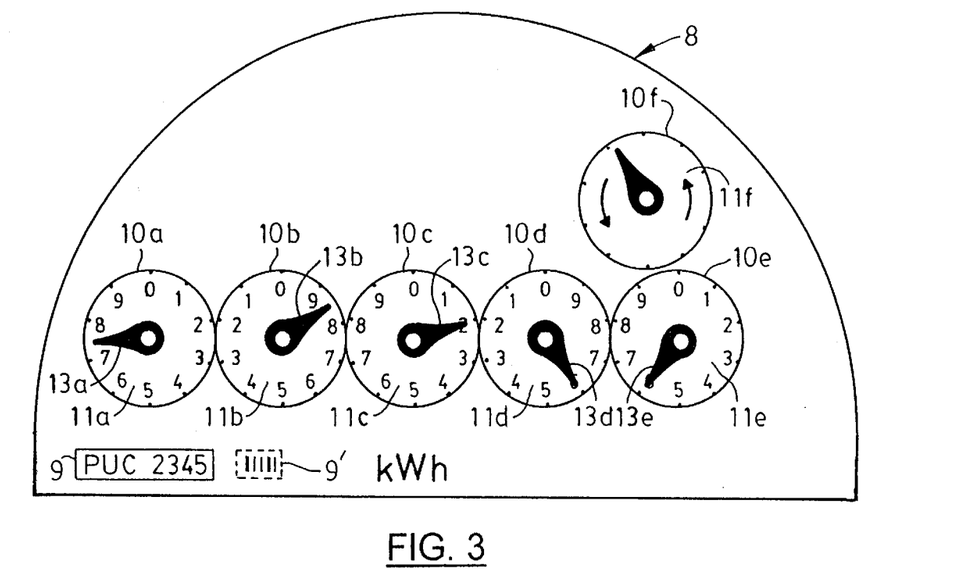
FIG. 3 shows in more detail the faceplate of an electric utility meter.

As shown in FIG. 1, a meter 2 is located at the premises of a consumer. The premises may comprise a residential home, a commercial building, an industrial building or an institutional building. In the context of the following description, the premises comprise a residential home or household denoted by reference 4. The meter 2 is of conventional design and includes known electrical, gas and water meters. In the context of the present description, the meter 2 comprises a meter for measuring the amount of electricity supplied by an electrical or power utility 6 to the household 4. The meter 2 comprises a meter face 8, on which are mounted a series of meter dials 10, indicated individually as 10a, 10b, 10c, 10d, 10e and 10f (FIGS. 1 and 3). The meter dials 10 indicate the electrical power consumed by the residential household 4. The power consumption is typically measured in kilo-Watt-hours (kWh) (FIG. 3).

As shown in FIG. 3, the meter face 8 also includes an identification code 9 which identifies the public utility and the number under which the meter 2 is registered to the household 4. The identification code may comprise a machine readable code, such as, a bar code 9' (as shown in broken outline).

As shown in FIG. 1, the system 1 comprises a remote unit 12 and central processing unit 14. The remote unit 12 comprises an image capture device 16 and a communications interface 18. The communications interface 18 provides a communication channel between the remote unit 12 and the central processing unit 14 located at the utility 6 (as will be described in more detail below).

The image capture device 16 is positioned and focused to capture an image of the dials 10 located on the face 8 of the meter 2. The image capture device 16 is implemented using conventional (including infra-red sensitive) video or still camera technology. In one embodiment, the image capture device 16 comprises a compact, and preferably low-power digital CCD (Charge Coupled Device) camera of known design. In another embodiment, the image capture device 16 is implemented using laser video camera technology such as the LVR-3000AN or LVR-5000A laser video camera manufactured by the Sony Corporation. In another variation, the image capture device 16 is implemented utilizing still video camera technology such as the MVC-7000 electronic photographic camera also from the Sony Corporation. The remote unit 12 may also include a light source 17 to provide illumination for the camera 16 when the ambient light is insufficient. The spectral characteristics of the light source 17 are preferably matched to the camera 16 being utilized.

As shown in FIG. 1, the remote unit 12 includes a memory unit 20. The memory unit 20 is coupled to the image capture device 16 and provides local storage for the scanned image generated by the camera. The configuration of the memory unit 20 depends on the implementation of the image capture device 16 as will be within the understanding of one skilled in the art. The memory unit 20 may, for example, form an integrated component of the image capture device 16.

Referring to FIG. 1, the remote unit 12 preferably includes a controller 22. The controller 22 interfaces the image capture device 16 to the communications interface 18. The communications interface 18 comprises a modem of conventional design and provides two-way communication between the remote unit 12 and the central processing unit 14 using conventional telephone line connections 24 or cellular or PCS wireless telephone connections. Because the communications between the remote unit 12 and the central processing unit 14 can be scheduled for non-peak times, for example, in the middle of the night, a lower speed modem (e.g. 9600 Baud) may be utilized. The modem 18 is coupled to the telephone lines 24 through a conventional telephone jack 26. Preferably, the telephone jack 26 is located adjacent to or in proximity to the meter 2. In another embodiment, the communications interface 18 comprises a cellular or PCS wireless telephone, through a line connecting modem 18 to the battery charging unit of the cellular or PCS wireless telephone, which includes an interface with the telephone hand-set when it is cradled in the charging unit, to receive incoming signals from central computer 28 causing the remote unit 12 to be turned on and transmit a reading from the meter 2.

The controller 22 may simply comprise a dedicated control circuit integrated with the modem 18 for handling the handshaking between the remote unit 12 and the central processing unit 14. Alternatively, the controller 22 comprises a microprocessor-based device which has been suitably programmed to perform the handshaking operations and more sophisticated processing as will be described below.

The principal function of the controller 22 is to oversee the two-way communication between the remote unit 12 and the central processing unit 14. The controller 22 decodes command packets transmitted by the central processing unit 14 for turning the image capture device 16 ON and OFF. In the upstream direction, the controller 22 utilizes the modem 18 to transmit a captured image as a continuous stream of data or as a series of data packets. In a further embodiment, the controller 22 is programmed to provide data compression and preprocessing of the scanned images before transmission to the central processing unit 14.

The controller 22 is implemented using commercially available devices such as the MCS51 Family of microcontrollers from Intel Corporation or the PIC16C71 microcontroller available from Microchip Technologies Inc. which has been suitably programmed to perform the processing steps according to the present method. The programming of the specific microcontroller is within the understanding of those skilled in the art. The 80C51 and the PIC16C71 controllers are both single chip devices comprising a microprocessor and "on-chip" program memory, data memory, input/output ports, timers and other on-chip resources.

The remote unit 12 is preferably line or mains powered. For electrical meters 2, a power input for the remote unit 12 can be suitably tapped as will be within understanding of those skilled in the art. In the case of a water meter or a gas meter where a source of electrical power is not readily available, the remote unit 12 includes an auxiliary power supply 13. The auxiliary power supply 13 is preferably integrated with the components of the remote unit 13 and may be implemented as a line-powered module, a battery-powered module, or a combination of a battery module and solar-powered charger. For a battery-powered implementation, preferably low power components are selected for the image capture device 16, memory 20, controller 22 and modem 18. The auxiliary power supply 13 may be augmented by tapping a power feed from the telephone jack (i.e. the "TIP" and "RING") provided the tap is within spec as will be apparent to those skilled in the art.

A further consideration for the auxiliary power supply 13, particularly in the case of gas meters, is the shielding of the remote unit 12. It will be understood that the remote unit 12 must be appropriately shielded to prevent sparking which could potentially ignite ambient natural gas in the area of the meter and thereby cause an explosion.

Figure 4A:
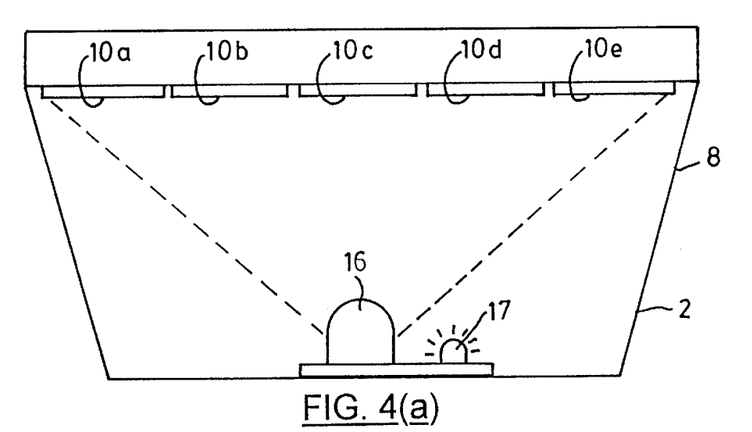
FIGS. 4(a) and 4(b) show various arrangements of the camera and the faceplate of the meter.
Figure 4B:
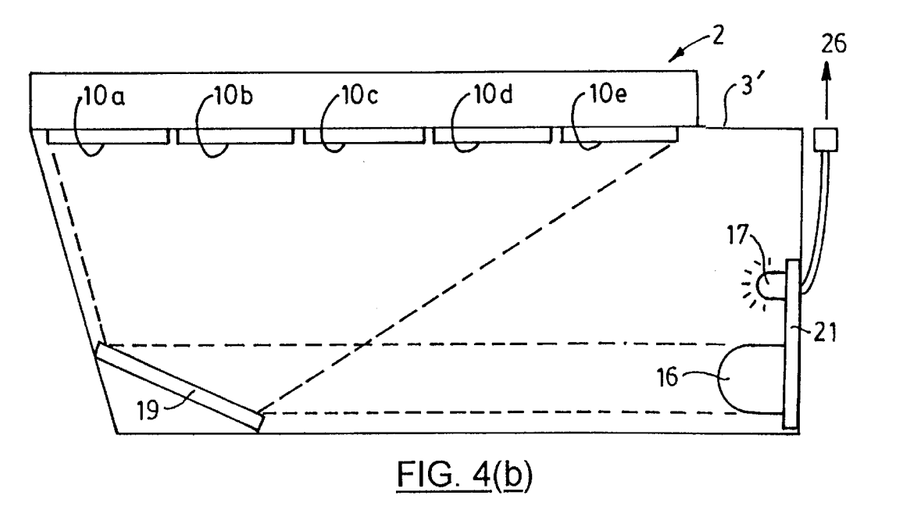

Reference is next made to FIGS. 4(a) and 4(b) which show alternative arrangements for the meter 2 and remote unit 4. As depicted (top view) in FIG. 4(a), the meter 2 includes a transparent cover or enclosure 3 and the camera unit 16 is attached to the inside of the cover 3. The camera 16 is focused directly on the face 8 of the meter 2. The cover 3 and remote unit 4 are assembled when the meter 2 is manufactured, or the cover 3 complete with the camera 16 and associated components 18, 20, 22 is retro-fitted in the field for existing meters. In another embodiment, the camera 16 is focused indirectly on the face 8 of the meter 2 by a mirror 19 or a prism. In this embodiment, the meter 2 includes a modified cover 3' to accommodate the camera 16 and the controller 22, memory 20 and modem 18. The camera 16, controller 22, memory 20 and modem 18 may suitably be mounted on a substrate 21, for example in a hybrid circuit using conventional techniques. In another variation, the camera unit 16 is mounted outside the transparent cover 3 using a transport mounting bracket which permits visual inspection, i.e. scanning, of the meter face 8.

Referring back to FIG. 1, the central processing unit 14 is typically located in the central office of the electrical power utility 6. The central processing unit 14 comprises a central computer 28, a communications interface 30 and a billing statements printer 32.

The communications interface 30 provides the interface for the two-way communication channel between the central processing unit 14 and the residential homes 4 which are serviced by the utility 6. The communications interface 30 is implemented using conventional technology and preferably comprises a multi-port modem device to provide sufficient bandwidth for handling the two-way traffic between the central unit 14 and all the remote units 12.

The central computer 28 is suitably programmed to process the captured image data (i.e. video frames or still pictures) received from the customers 4 of the utility 6. The principal functions performed by the central computer 28 include transmitting commands to the remote units 12 to initiate image capture, receiving the image data via the communications interface 18 and storing the image data in memory 34, processing the image data for each remote unit 12 to determine the energy consumption for that household 4, and generating a billing statement 36 which is sent to each residence 4.

The scanned image data received from the remote units 12 is stored in memory 34. The memory 34 comprises a suitable mass storage device such a hard disks or magnetic tape devices. As shown in FIG. 1, the central unit 14 may also include a bank of video disk recorders 38. The video disk recorders 38 are used to record and archive images of the meter face readings and according to another aspect of the invention, the billing statements printer 32 reproduces the meter images on the billing statement 36 as will be described in more detail below.

Reference is next made to FIG. 3, which shows the face 8 and the dials 10 of the meter 2 in more detail. The meter 2 depicted in FIG. 3 is of the conventional analog type. Each dial 10 comprises a clock face 11 and a pointer 13, shown individually as 11a, 11b, 11c, 11d, and 11e, and 13a, 13b, 13c, 13d and 13e, respectively. Each clock face 11 is marked from 0 to 9 by increments of one, and the reading for each dial meter 10 is taken from the position of the pointer 13 with respect to the numerical markings. (The face of the dial 10f bears graduations instead of numerical markings.) The program executed by the central computer 28 includes an image processing module which determines the power consumption by comparing the positions of the pointers (i.e. current reading on the meter 2) in the present scanned image of the meter with the pointer positions (i.e. previous reading taken from the meter 2) in the previous scanned image. The image processing module is implemented using conventional techniques which are within the skill of those skilled in the art, and include, for example, utilizing a pattern recognition technique for determining the position of the pointer 13 in each dial 10 and a look-up table for obtaining the reading associated with the pointer 13 positions on the dials 10.

Figure 2:
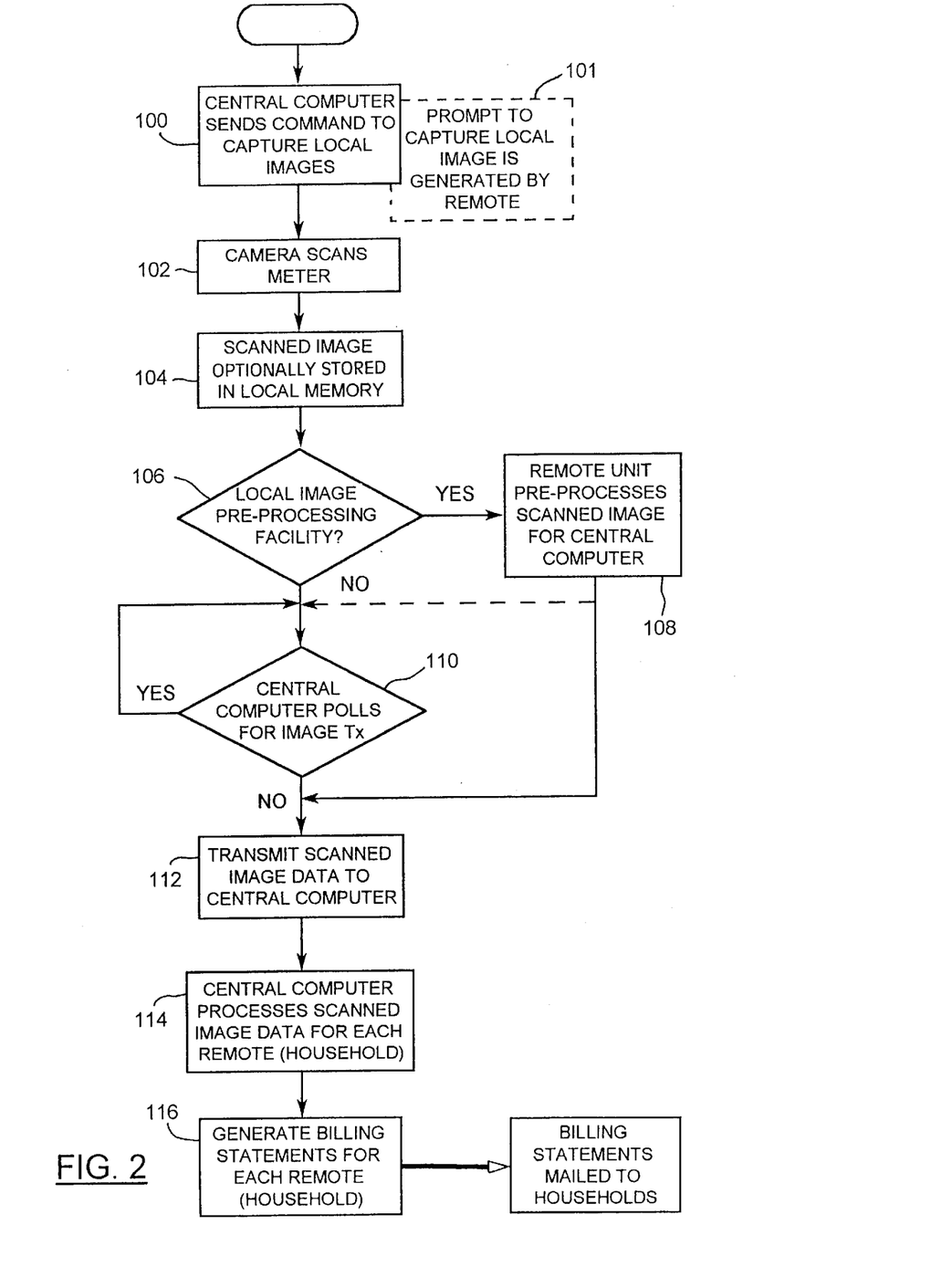
FIG. 2 shows in flow chart process steps for remote meter viewing and reporting according to the present invention.

Reference is next made to FIG. 2, which shows in flow-chart form the process steps for remote viewing and reporting of a meter according to the present invention. The first step in block 100 comprises the central computer 28 dialling each remote unit 4 and establishing a connection with the camera 16 and/or controller 22. The connection is preferably made at a low-traffic time, e.g. in the middle of the night, when the telephone line would normally not be in use. Where the remote 4 includes a controller 22, a more sophisticated handshaking protocol may be conducted between the remote 4 and the central computer 28. For example, the remote 4 can provide an ID code (stored in non-volatile memory or hard-wired) to verify its identity in response to a query from the central computer 28. Next in block 102, the central computer 28 activates the camera 16 to scan the meter face 8 and thereby capture an image of the readings on the dial meters 10. The operation in step 102 comprises a simple ON pulse which is transmitted by the central computer 28 to the camera 16 via the modem 18. If the remote unit 4 includes a controller 22, the central computer 28 sends a command message which instructs the controller 22 to activate the camera 16. In another embodiment, the controller 22 uses an internal or local clock to generate a prompt to capture an image of the meter face 8 (as indicated by block 101 in broken outline). This embodiment preferably includes a synchronization command to periodically synchronize the local clocks with the central computer 28.

The next step in the process involves the camera 16 scanning the meter face 8 and capturing an image of the dial meter 10 readings (block 102). In one embodiment, the image is transmitted simultaneously as it is captured by the camera 16. According to another embodiment, the captured image is optionally stored in the local memory 22 (block 104). This approach is advantageous where there is a delay before the controller 22 transmits the captured image to the central computer 28 or where the controller 22 pre-processes the captured image. In decision block 106, the unit 4 determines if pre-processing is to be performed. This decision block may be preprogrammed or set by a command from the central computer 28. The pre-processing performed by the controller 22 comprises compressing the captured image for transmission and/or applying known image processing algorithms to the captured image in order to reduce the processing overhead for the central computer 28 (block 108).

Next in decision block 110, the remote unit 4 waits for a poll or transmit request from the central computer 28 in the case of a delayed image transmission. The transmit request is in the form of command which is received and decoded by the controller 22. For example, the central computer 28 prompts the remote 4 to capture an image during daylight hours when ambient light conditions are high, but requests that the transmission of the captured image be delayed until late night when telephone traffic is low.

In block 112, the captured image is transmitted from the remote 4 to the central computer 28 at the utility or their agents or surrogates 6 via the modem 18 and communications interface 30. At the utility 6, the computer 28 gives the captured image a time-stamp and stores the image in memory 34. If the captured image is transmitted on a delayed basis, the time-stamp is adjusted to the actual time the prompt was issued. In known matter, a record is established for each household (i.e. remote unit 4) and the current captured image is stored along with one or more previous captured images for that household. According to another aspect of the present invention, the captured image is recorded (archived) to video disk 38. The archived images are then available for reproduction on the billing statement (as described below) or for audit purposes.

The central computer 28 then under program control processes the captured image using known image processing algorithms (block 114). The image processing algorithms preferably check the integrity of the captured image. If the image is corrupted or was taken with insufficient ambient light, then the computer 28 initiates exception processing, comprising an investigation into the cause of the corrupted image. In one embodiment, the central computer 28 includes an image processing algorithm which determines the number of kiloWatthours from the positions of the pointers 13 on the dial meters 10 captured in the image. This figure is compared to the number of kiloWatthours determined from the previous captured image (which is still stored in memory 34 and therefore may be verified) to calculate the electricity consumption of the household since the last reading. The implementation of such an image processing algorithm is known in the art and comprises pattern matching techniques as will be readily understood by those skilled in the art.

Figure 5:
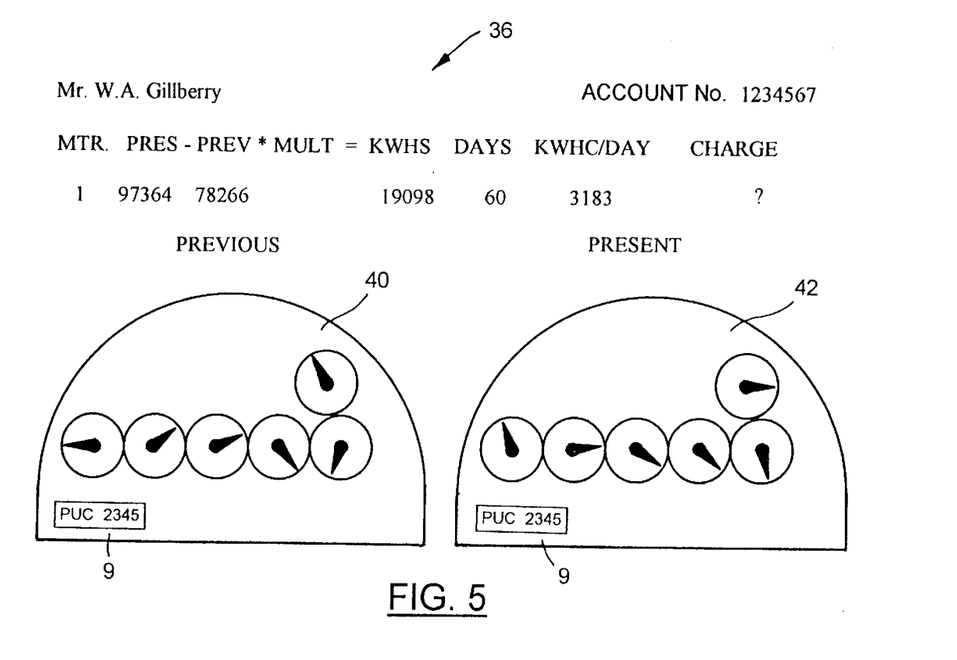
FIG. 5 shows in schematic form a billing statement generated according to the present invention.

Once the consumption has been determined, the next step in the process is to generate the billing statement 36. According to this aspect of the invention, a billing statement 36 is generated as depicted in FIG. 5. Referring to FIG. 5, the billing statement 36 comprises a reproduction of the previous meter face image 40 and the current face image 42. Advantageously, the previous and current meter reading images 40, 42 are retrieved from memory 34 or the laser video disk 38. It will be appreciated that according to this aspect of the invention, the billing statement 36 provides the consumer with a means of visually reconciling the charge from the utility. The billing statement 36 preferably includes the meter identification code 9. The meter code 9 provides the consumer with an assurance that the statement contains a reproduction of their meter 2. The remainder of the billing statement 36 comprises a number of printed fields which depend on the practices followed by the particular utility.

Instead of the utility 6, the scanning of the meters and the processing of the billing statements may be provided by an agent or surrogate of the utility. For example, a telecommunications organization would process electricity, gas and water bills and generate a multi-part invoice, thereby resulting in considerable savings in postage.

In summary, the present invention provides a system wherein the central computer 28 through programmed control initiates a call to each of the remote units 12 at a convenient time, for example, in the middle of the night. Once a connection is established between the communications interface 30 and the modem 18, the central computer 28 sends a command to activate the image capture device 16. The camera 16 in turn captures an image of the meter face 8, the identification number or code 9, and the dial readings 10. The captured image is transmitted to the central computer 28. (The captured image may also be stored in memory and uploaded to the central computer 28 at a later time.) The central computer 28 receives the captured image through the communications interface 30, and the image is given a time-stamp, i.e. date and time for the reading, and stored in memory 34. The present and previous scanned images for each meter 2 are retrieved from memory 34 and the power consumption for the household since the last reading is determined. A billing statement 36 is then generated based on the power consumed, and sent to the household. In another aspect, the billing statement 36 is printed with images of the previous and present meter face readings.

While the present invention is described in the context of a public utility application, the invention has wider applicability. For example, the system is applicable to leasing companies who lease office equipment, e.g. photocopiers, to customers situated in remote locations and where it is desirable to monitor and record the usage of the leased equipment. According to this aspect of the invention, the equipment is fitted with a meter and the usage is monitored from a remote location, thus enabling the timely scheduling of visits by service representatives to perform maintenance and thereby helping to ensure minimal down-time of the equipment and optimal equipment performance.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for viewing and reporting readings from a meter located in a remote location, said system comprising:
   (a) image capture means for capturing an image of a reading on the meter, said image capture means being located at said meter;
   (b) said image capture means including transmitter means for transmitting said image to another location;
   (c) central processing means for processing said image captured by said image capture means located at said meter;

(d) said central processing means being located at a distance from the meter and including communication means for receiving said transmitted image from said image capture means;

(e) means for comparing said image to a previous image taken of said meter and determining a consumption amount and having means for generating a billing statement based on said consumption amount; and (f) means for providing a reproduction of said image on said billing statement.

2. The system as claimed in claim 1, further including means for providing a reproduction of said previous image on said billing statement.

3. The system as claimed in claim 1, wherein said meter comprises a utility meter located in a building at a distance from a utility company.

4. The system as claimed in claim 1, wherein said image capture means comprises a camera having a lens focused on the face of said meter.

5. The system as claimed in claim 4, further including a mirror for focusing the lens of said camera on the face of said meter.

6. The system as claimed in claim 4, wherein said camera comprises a digital camera.

7. The system as claimed in claim 1, wherein said transmitter means comprises a modem.

8. The system as claimed in claim 7, further including a controller coupled to said modem, said controller including means for receiving command data from said central processing means and means for controlling transmission of said captured images to said central processing means.

9. The system as claimed in claim 8, wherein said controller includes means for pre-processing said captured image and memory for storing said images.

10. A method for viewing and reporting readings from a meter located in a remote location, the remote location including an image capture device focussed on the meter and a communications device accessible by a central processing unit through a communications link, said method comprising the steps of:

(a) establishing a connection between said remote communications device and said central processing unit;

(b) enabling said image capture device to capture an image of readings on said meter;

(c) transmitting said captured image to said central processing unit via said communications link;

(d) processing the meter readings captured in said image at said central processing unit to generate a consumption figure;

(e) generating a billing statement for said consumption figure; and (f) reproducing said captured image on said billing statement.

11. The method as claimed in claim 10, further including the step of pre-processing said captured image at said remote location prior to transmitting the image to said central processing unit.

12. The method as claimed in claim 11, wherein said step (d) comprises comparing the meter readings for said captured image with meter readings of previously captured image taken from said same remote meter.

13. The method as claimed in claim 12, further including the step of providing on said billing statement reproductions of said captured image and said previously captured image.

14. The method as claimed in claim 10, wherein said step (a) comprises dialing said remote communications device and connecting over a telecommunications link.

15. The method as claimed in claim 14, wherein said step of transmitting said captured image is delayed for a predetermined time or until a transmit request is received from said central processing unit.

* * * * *